United States Patent
Jansen et al.

(10) Patent No.: US 6,360,333 B1
(45) Date of Patent: Mar. 19, 2002

(54) METHOD AND APPARATUS FOR DETERMINING A PROCESSOR FAILURE IN A MULTIPROCESSOR COMPUTER

(75) Inventors: Kenneth A. Jansen, Spring; Sompong P. Olarig, Cypress; John E. Jenne, Houston, all of TX (US)

(73) Assignee: Compaq Computer Corporation, Houston, TX (US)

( * ) Notice: Subject to any disclaimer, the term of this patent is extended or adjusted under 35 U.S.C. 154(b) by 0 days.

(21) Appl. No.: 09/196,463

(22) Filed: Nov. 19, 1998

(51) Int. Cl.⁷ ............................................. G06F 11/00
(52) U.S. Cl. .................................... 714/25; 709/202
(58) Field of Search ............................. 714/25, 2, 8, 9, 714/10, 11, 13, 31, 39, 41; 709/201, 202, 213, 203

(56) References Cited

U.S. PATENT DOCUMENTS

| | | | | |
|---|---|---|---|---|
| 4,646,298 A | * | 2/1987 | Laws et al. .................... 714/11 |
| 4,698,785 A | * | 10/1987 | Desmond et al. ............. 714/38 |
| 4,807,228 A | * | 2/1989 | Dahbura et al. .............. 714/13 |
| 4,924,466 A | * | 5/1990 | Gregor et al. ................. 714/2 |
| 5,278,843 A | * | 1/1994 | Ako ........................... 714/797 |
| 5,390,324 A | | 2/1995 | Burckhartt et al. ......... 395/575 |
| 5,596,711 A | | 1/1997 | Burckhartt et al. ..... 395/182.21 |
| 5,627,962 A | | 5/1997 | Goodrum et al. ....... 395/182.11 |
| 5,652,833 A | | 7/1997 | Takizawa et al. ....... 395/182.08 |
| 5,696,895 A | | 12/1997 | Hemphill et al. ....... 395/182.02 |
| 5,737,604 A | | 4/1998 | Miller et al. ................ 395/651 |
| 5,748,873 A | * | 5/1998 | Ohguro et al. ................ 714/11 |
| 5,751,932 A | * | 5/1998 | Horst et al. ................... 714/12 |
| 5,764,882 A | | 6/1998 | Shingo .................. 395/182.09 |
| 5,781,716 A | | 7/1998 | Hemphill et al. ....... 395/182.02 |
| 5,805,790 A | * | 9/1998 | Nota et al. .................... 714/10 |
| 5,838,894 A | * | 11/1998 | Horst .......................... 714/11 |
| 6,021,261 A | * | 2/2000 | Barrett, Jr. et al. ..... 395/183.13 |

* cited by examiner

*Primary Examiner*—Nadeem Iqbal
(74) *Attorney, Agent, or Firm*—Akin, Gump, Strauss, Hauer & Feld, LLP

(57) ABSTRACT

A multiprocessor computer includes a fault detection scheme which detects and identifies the failure of one of the processors. Each processor is assigned a write location, which may be a unique register. During normal computer operation, each processor intermittently performs a test and stores the results of the test in the assigned write location. The stored results are compared to expected results, and an error signal is generated if the stored results differ from the expected results to indicate that one of the processors has failed.

67 Claims, 7 Drawing Sheets

METHOD AND APPARATUS FOR DETERMINING A PROCESSOR FAILURE IN A MULTIPROCESSOR COMPUTER

BACKGROUND OF THE INVENTION

1. Field of the Invention

The present invention relates generally to computer systems and, more particularly, to methods and apparatus for determining when a processor has failed.

2. Description of the Related Art

About two decades ago, a relatively compact and basic computing device, which would come to be known as the personal computer or PC, was being developed. Like all personal computers since, these early personal computers utilized microprocessors coupled to various types of memory devices. However, due to the extremely limited computing capabilities of these early microprocessors and the limited size and costliness of high speed memory, these early personal computers truly were nothing but stand alone personal computing devices.

In the intervening years, microprocessors, memory devices, software, and many other portions of a computing system have seen rapid improvements in speed, capacity, complexity, and performance. By way of example, the latest generation microprocessors from Intel Corporation include the Pentium, Pentium Pro, and Slot-2 microprocessors. These processors are so powerful that they not only would have been considered an unbelievable evolution over the Z80 and 8080 microprocessors of two decades ago, but they also offer significant enhancements over the prior generation 486 processors. Even in view of this rapid and incredible improvement of microprocessors, the resource requirements of software are always increasing, as are the variety of uses for "personal" computers. These needs, in turn, drive the need for the design and development of ever more powerful and efficient computer systems.

In view of these vast technological improvements, personal computers have made great strides from their humble beginnings to provide solutions for the ever expanding needs and desires of the computing public. For example, two decades ago, virtually all large or complicated computing operations, from data processing to telephone networks, were handled by large mainframe computers. However, networks of microprocessor-based personal computers have made tremendous inroads into areas that were once the exclusive domain of such large mainframe computers. Such networks of personal computers provide the computing power and centralized access to data of mainframe systems, along with the distributed computing capability of stand alone personal computers. These networks typically include tens, hundreds, or even thousands of personal computers, including powerful personal computers that can act as servers. Indeed, as such networks have become larger and more complex, there has been a need for improving the computing performance of servers on the network. To address this need, multiple processors are now being used in personal computers which are configured to act as servers in order to produce more powerful servers.

The expansion of microprocessor-based personal computers into the mainframe domain, however, has not been problem free. Mainframe computers have historically been designed to be reliable and extremely fault tolerant. In other words, a failure of a portion of the mainframe computer does not typically result in lost or corrupted data or extensive down time. Because personal computer networks are increasingly being used instead of mainframe systems, users are demanding that such networks provide fault tolerance similar to that found in the mainframe systems.

In view of these user demands, manufacturers have devised various ways for providing fault tolerance in personal computer networks. Many of these developments have concentrated on the fault tolerance of the servers in a personal computer network, because servers are typically the cornerstone of most networks. In other words, because the servers typically provide applications, data, and communications among the various workstations, the failure of one server could cause the entire network to fail.

In a multiprocessor computer such as those typically used as servers, one problem that may occur involves the failure of one of the multiple processors. Because of this possibility, a fault-tolerant scheme should include the ability to detect when one of the multiple processors has failed. Current fault detection schemes of this type typically attempt to determine whether a processor has failed during the power up sequence. For example, one method of booting a multiprocessor computer involves the assignment of a primary processor which is responsible for activating the remainder of the computer system. Once the primary processor has been successfully started, the primary processor then tests the remaining processors and various other components in the computer system. While this scheme facilitates the detection of a failed secondary microprocessor, it does not address a situation where the primary microprocessor fails. In such a situation, the primary microprocessor would be unable to activate the secondary processors, leaving the entire server incapacitated even though one or more secondary processors may remain fully operational.

In an effort to address this problem, one technique utilizes a timer associated with each processor, along with specialized hardware to determine the hierarchy of the multiple processors. When the system is reset, the primary processor is initialized by the hardware and activated to boot the remainder of the computer system including the secondary processors. However, if the primary processor does not take certain actions within the period set by the timer, the timer expires and sends a signal to the hardware to cause the hierarchy of the multiple processors to be changed. Thus, one of the secondary processors becomes the primary processor, and it attempts to activate the computer system. This process continues until a successful boot operation occurs.

This technique has been revised to cause the primary processor to check an error log to determine if certain critical errors have previously occurred on that processor. If so, the booting sequence stops, and the timer causes the hardware to reestablish the hierarchy of the multiple processors. In addition, the primary processor also checks for critical errors prior to actually loading the operating system. If any errors have occurred, the primary processor transfers control to one of the secondary processors and shuts itself off.

It should be appreciated that fault detection schemes such as those described above are only capable of detecting a failed processor during the power up sequence when the server is turned on. Although this type of scheme may be quite satisfactory in certain circumstances, depending upon the frequency of power up sequences and the criticality of the network, several shortcomings still exist. For example, in many networks, the servers are only turned on and off when the network malfunctions or for routine maintenance. Clearly, if a processor fails and causes the server to be shut down, the network will at least lose the availability of that server even though the server may still contain several operable processors, and, of course, the removal of the server may cause the entire network to go down.

When a processor fails, it would be desirable to detect which processor has failed immediately so that the computer may discontinue use of the processor and so that the failed processor may be replaced. Presently used testing methods require each processor to perform an operation simultaneously. The results of the operation are compared with one another. If the results are the same, then all processors are assumed to be working properly. However, if the results do not match, then one of the processors is assumed to have failed. In a computer system having three or more processors, the failure of a single processor is relatively easy to pinpoint using this methodology. However, in a dual processor system, such a method merely provides an indication that one of the two processors has failed, without providing an indication of which particular processor has failed. Without being able to determine which processor has failed, the computer system cannot discontinue use of the failed processor and it cannot identify the failed processor for subsequent replacement.

The present invention may address one or more of the problems set forth above.

SUMMARY OF THE INVENTION

Certain aspects commensurate in scope with the originally claimed invention are set forth below. It should be understood that these aspects are presented merely to provide the reader with a brief summary of certain forms the invention might take and that these aspects are not intended to limit the scope of the invention. Indeed, the invention may encompass a variety of aspects that may not be set forth below.

In accordance with one aspect of the present invention, there is provided a method of determining a processor failure in a multiprocessor computer. The method comprising the acts of: (a) identifying each processor in the computer; (b) assigning a unique write location to each identified processor; (c) directing each processor to perform a given test and to store a result of the test in the respective unique write location; (d) comparing the result stored in each unique write location to a respective expected result; and (e) indicating a failure of a particular one of the identified processors in response to the stored result being different than the expected result. The method may also comprise the acts of: setting a rate for directing each processor to perform a given test during normal operation of the computer; and clearing each write location in response to the stored result being the same as the expected result.

In accordance with another aspect of the present invention, there is provided an apparatus for detecting a failed processor of a multiprocessor computer. The apparatus includes: means for identifying each processor in the computer; means for assigning a unique write location to each identified processor; means for directing each processor to perform a given test and to store a result of the test in the respective unique write location; means for comparing the result stored in each unique write location to a respective expected result; and means for indicating a failure of a particular one of the identified processors in response to the stored result being different than the expected result. The apparatus may also include means for setting a rate for directing each processor to perform a given test during normal operation of the computer, and means for clearing each write location in response to the stored result being the same as the expected result.

In accordance with still another aspect of the present invention, there is provided a tangible medium containing a software program for detecting a failed processor of a multiprocessor computer, which includes a routine for assigning a unique write location to each processor in the computer; a routine for directing each processor to perform a given test and to store a result of the test in the respective unique write location; a routine for comparing the result stored in each unique write location to a respective expected result; and a routine for indicating a failure of a particular one of the identified processors in response to the stored result being different than the expected result.

In accordance with yet another aspect of the present invention, there is provided a network that includes a plurality of interconnected computers, wherein at least one of the plurality of interconnected computers includes a multiprocessor computer. The multiprocessor computer includes means for detecting a failed processor of a multiprocessor computer. The detecting means includes means for identifying each processor in the multiprocessor computer; means for assigning a unique write location to each identified processor; means for directing each processor to perform a given test and to store a result of the test in the respective unique write location; means for comparing the result stored in each unique write location to a respective expected result; and means for indicating a failure of a particular one of the identified processors in response to the stored result being different than the expected result. The detecting means may also include means for setting a rate for directing each processor to perform a given test during normal operation of the computer; and means for clearing each write location in response to the stored result being the same as the expected result.

In accordance with a further aspect of the present invention, there is provided a computer that includes a plurality of microprocessors, where each microprocessor repeatedly performs a given test during operation of the computer. The computer also includes a plurality of registers, where each register is assigned to a selected one of the plurality of microprocessors for storing a result of each given test performed by the respective microprocessor. A comparator is coupled to the plurality of registers to receive the result stored in each register. The comparator compares each stored result with an expected result and generates an signal indicative of a failed microprocessor in response to one of the stored results being different than a respective one of the expected results.

BRIEF DESCRIPTION OF THE DRAWINGS

The foregoing and other advantages of the invention will become apparent upon reading the following detailed description and upon reference to the drawings in which.

DETAILED DESCRIPTION OF SPECIFIC EMBODIMENTS

Figure 1:
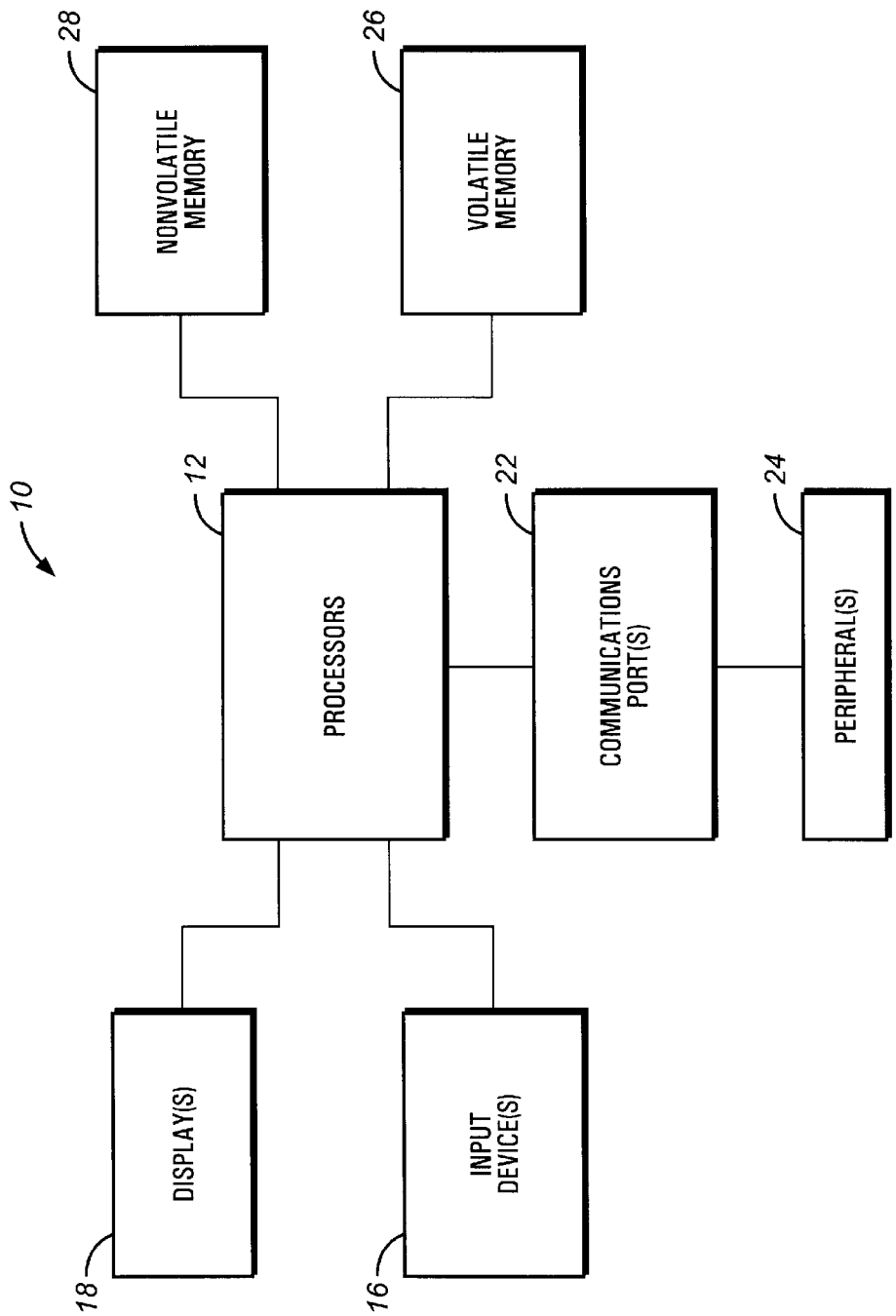
FIG. 1 illustrates a block diagram of an exemplary multiprocessor computer system.

Turning now to the drawings, and referring initially to FIG. 1, a block diagram depicting a multiprocessor computer system, generally designated by the reference numeral 10, is illustrated. In this embodiment of the system 10, multiple processors 12, such as microprocessors, control many of the functions of the system 10. In one particular embodiment, the processors 12 may be, for example, Pentium Pro or Slot-2 processors available from Intel Corporation.

Various other devices may be coupled to the processors 12, depending upon the functions that the system 10 performs. For instance, the system 10 may include various input devices. The input devices may include user interfaces such as a keyboard, a mouse, and/or a voice recognition system, for instance. The system 10 may also include a display 18. The display 18 may include a CRT, a flat panel display, LEDs, and/or an audio system, for instance.

A communications port 22, such as a network interface card for example, may also be coupled to the processors 12. The communications port 22 may be coupled to one or more peripheral devices 24. Such peripheral devices 24 may include a modem, a printer, and/or a scanner, for instance. Of course, the peripheral devices 24 may also include additional computers, as the computer system 10 may act as a server in a computer network that includes multiple computers and other peripheral devices.

Because the processors 12 control the functioning of the system 10 generally under the control of software programming, memory is coupled to the processors 12 to store and to facilitate execution of these programs. For instance, the processors 12 may be coupled to volatile memory 26, which may include dynamic random access memory (DRAM) and/or static random access memory (SRAM). In addition, the processors 12 may be coupled to nonvolatile memory 28, which may include read only memory, a hard drive, and/or flash memory. Typically, the size of the nonvolatile memory 28 is selected to be large enough to store any necessary operating system, certain application programs, and fixed data, while the volatile memory 26 may be quite large so that it may store dynamically loaded applications.

Figure 2:
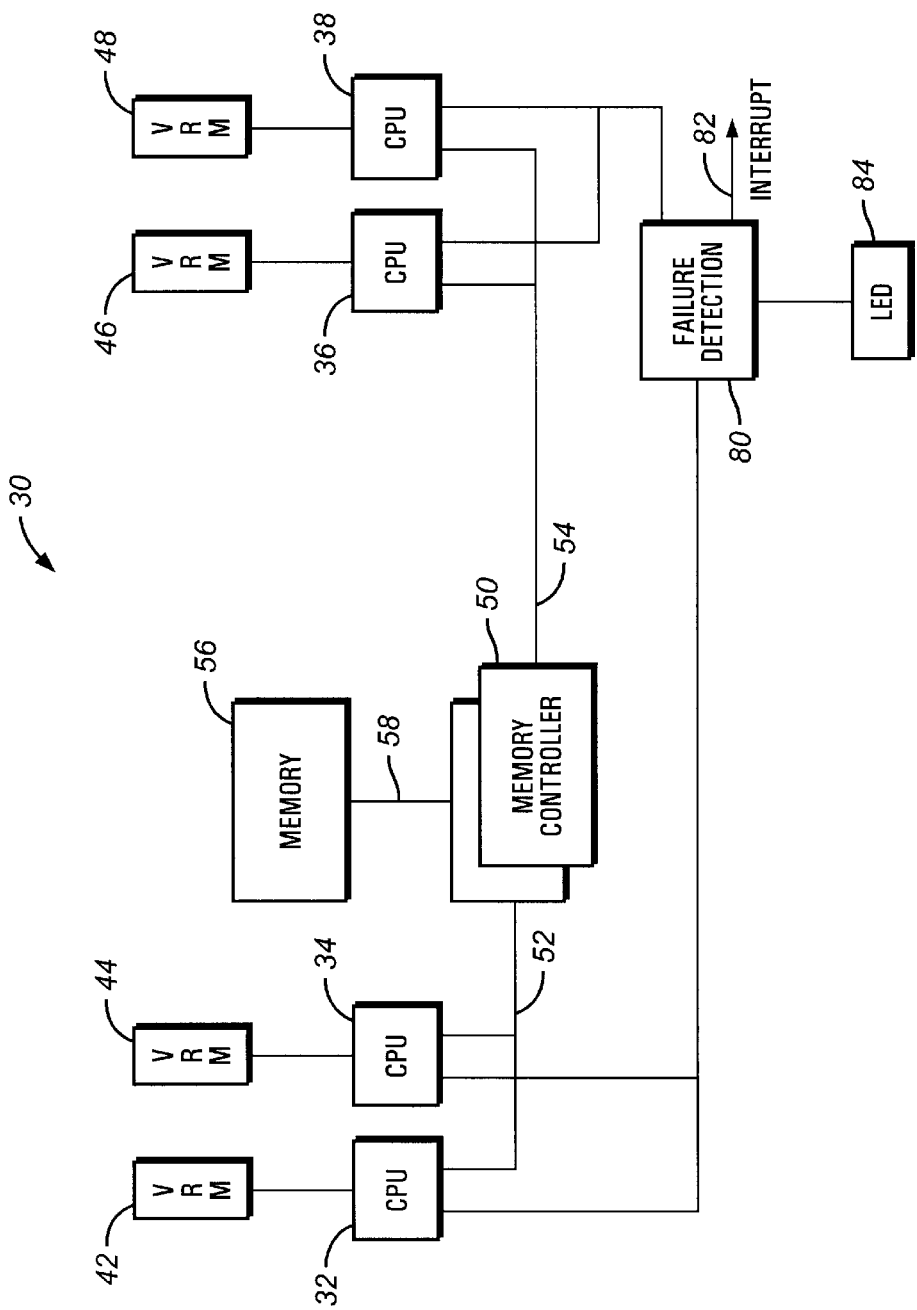
FIG. 2 illustrates a block diagram of a portion of a multiprocessor computer.

A block diagram of a multiprocessor personal computer, such as one that may be used in the system 10, is illustrated in FIG. 2 and generally designated by the reference numeral 30. In this embodiment, the computer 30 includes four processors, or CPUs, 32, 34, 36, and 38. Each of the processors 32, 34, 36, and 38 is illustrated as being powered by its own dedicated voltage regulator module (VRM) 42, 44, 46, and 48, respectively. Of course, it should be understood that the number of processors used in the multiprocessor computer 30 and the manner in which these processors are powered is not crucial.

As in a conventional computer, each of the processors 32, 34, 36, and 38 are coupled to a memory controller 50 via a bus. Because the illustrated computer 30 is a split bus design, the processors 32 and 34 communicate with the memory controller 50 via a bus 52, and the processors 36 and 38 communicate with the memory controller 50 via a bus 54. However, it should be understood that the teachings set forth herein apply to other bus designs as well, such as a single bus design or multiple bus design like the EV6 bus used with the Alpha 21364 available from Digital Equipment Corporation which includes one processor per bus and as many buses as processors. The memory controller 50 communicates with a memory 56 via a bus 58, as is known in the art. As described with reference to FIG. 1, the memory 56 may include, for instance, volatile memory and/or nonvolatile memory.

Unlike conventional computers, the computer 30 includes a fault detection scheme that tests each of the processors 32, 34, 36, and 38 during the operation of the computer 30 in order to detect a processor failure. If one of the processors 32, 34, 36, or 38 is determined to have failed in some respect, the failed processor can be identified, it can be removed from the continued operation of the computer 30 without disrupting the operation of the other processors, it can be the removed from the computer or replaced, and/or the user or administrator of the computer 30 can be notified of the processor failure. Various exemplary methods and apparatus for implementing such a fault detection scheme are described below. Although the exemplary fault detection scheme is described in reference to detecting faulty processors, it might also be implemented to detect faults in other intelligent devices, such as memory controllers for example.

Figure 3:
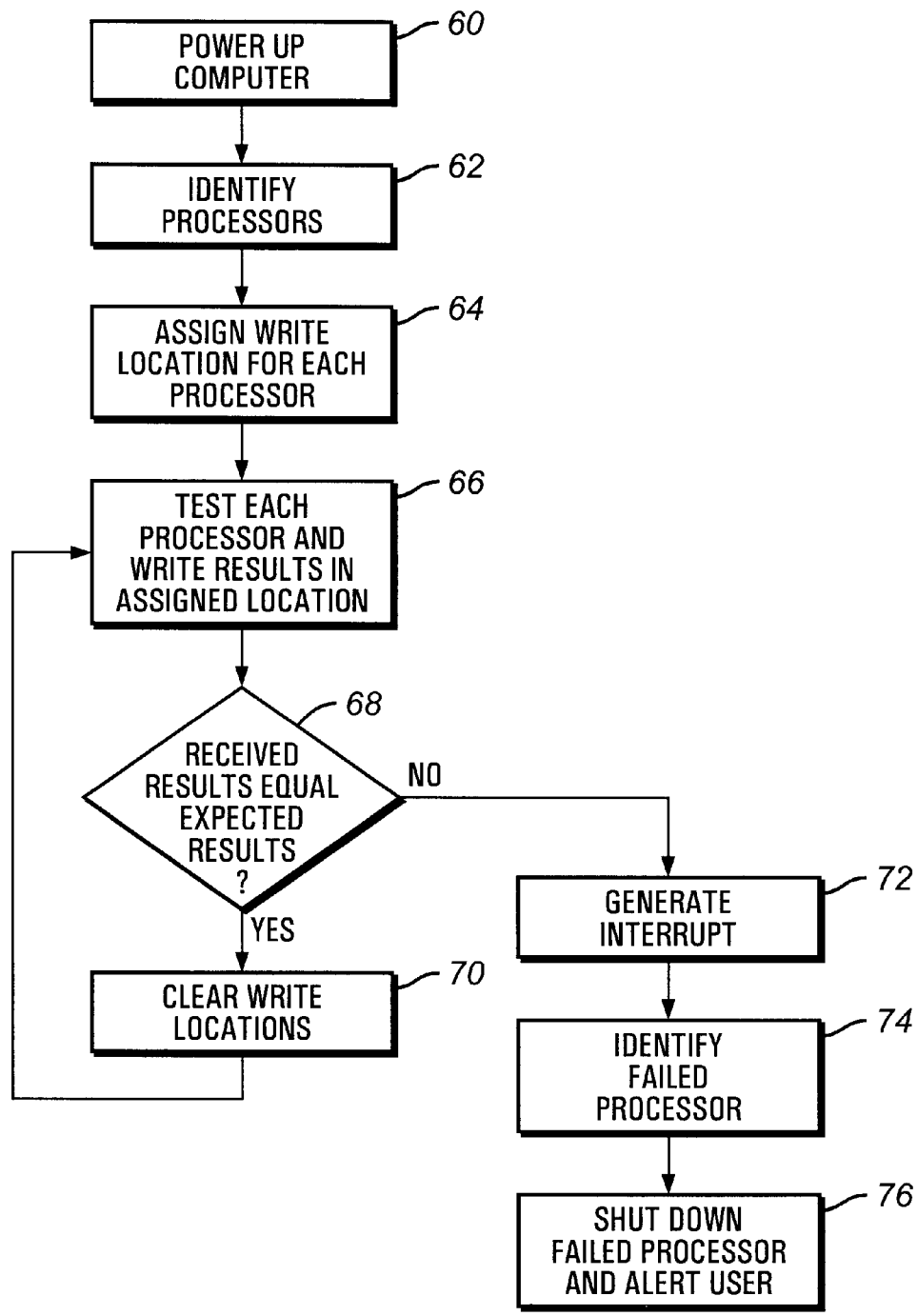
FIG. 3 illustrates a flow chart depicting the general operation of one embodiment of a fault-detection scheme for the multiprocessor computer of FIG. 2.

Referring now to FIG. 3, a flowchart illustrates an example of the fault detection scheme. This scheme may be implemented wholly in software, so that it may be downloaded onto a suitable multiprocessor computer via disk, read only memory, or over the internet, for example, or it may be partially implemented in hardware as discussed subsequently.

When the computer 30 is initially powered up, the computer's basic input-output system (BIOS), for example, identifies the processors 32, 34, 36, and 38 in the computer 30. (Blocks 60 and 62). Once identified, each processor 32, 34, 36, and 38 is assigned a different location for writing the results of a test performed by the particular processor. (Block 64). These different write locations may correspond to memory locations in the memory 56 or in the core logic chip set or, as described below, the write locations may correspond to registers.

Once the processors have been identified and the write locations assigned, each processor 32, 34, 36, and 38 must perform a particular test and write the results to its corresponding write location within a certain period of time. (Block 66). The rate at which these tests occur may be determined as described below, and the rate may be the same for each processor or it may be unique to each processor. At the end of each test period, the actual test results stored in the write locations are compared to expected test results. (Block 68). If the actual test results are the same as the expected test results, the assigned write locations are cleared and another test will be performed in accordance with the prescribed test rate. (Block 70). However, if the actual test results are different than the expected results, an error signal, such as an interrupt signal, is generated. (Block 72). Of course, other suitable types of error messages or signals may be generated instead of an interrupt signal. For example, a shared memory location, such as in non-volatile memory, may be updated, e.g., by setting a flag for instance, to indicate a processor error. The memory location may be periodically checked to determine whether an error was found in any of the processors. In response to the error signal, the failed processor is identified so that it may be removed from continued operation and so that the user may be notified of the particular processor failure. (Blocks 74 and 76).

To facilitate the detection of a processor failure, each processor 32, 34, 36, and 38 is advantageously coupled to a failure detection circuit 80, as illustrated in FIG. 2. Upon detecting the failure of a particular processor, the failure detection circuit 80 delivers an error signal, such as an interrupt signal, to line 82. The error signal indicates that one of the processors 32, 34, 36, or 38 has failed so that it may be identified. Once identified, the failed processor can be removed from further operation, removed from the computer, and/or replaced, and the user may be notified of the error.

Various techniques may be used for removing a failed processor from further operation without shutting down the entire computer. For example, if the processors 32, 34, 36, and 38 are Pentium Pro or Slot-2 processors, a STPCLK# (stop clock) signal may be asserted to place the failed processor into a low power state. In response to the STPCLK# signal, the processors put themselves into a stop grant state and stop providing internal clock signals to all units except the bus unit and the APIC unit. The processors will continue to snoop bus transactions while in the stop grant state. In addition, the operating system may be informed of the processor failure by any suitable method so that the operating system will not schedule any further tasks for the failed processor.

It should be understood that the processors 32, 34, 36, and 38 typically use write back caches during normal operation. By using the STPCLK# signal as described above, the caches may still be snooped so that any modified lines in the cache are not lost. Of course, since these lines may have been modified in error due to the fact that the processor has malfunctioned, it may be decided that the lines in the cache should not be recovered.

The failure detection circuit 80 also delivers a signal to the user or administrator of the computer 30 to indicate which processor has failed so that it may be replaced. As illustrated in FIG. 2, the failure detection circuit 80 illuminates an appropriate LED 84 to indicate which processor has failed. Advantageously, a respective LED 84 is positioned on or near each processor 32, 34, 36, and 38 to help insure that the failed processor is readily identifiable to the user. Of course, a variety of other techniques, such as a graphical user interface (GUI), an LCD, or CRT message, may also be used. Also, a real time clock (not shown) advantageously may be used to provide an indication of the time the failure occurred.

Figure 4:
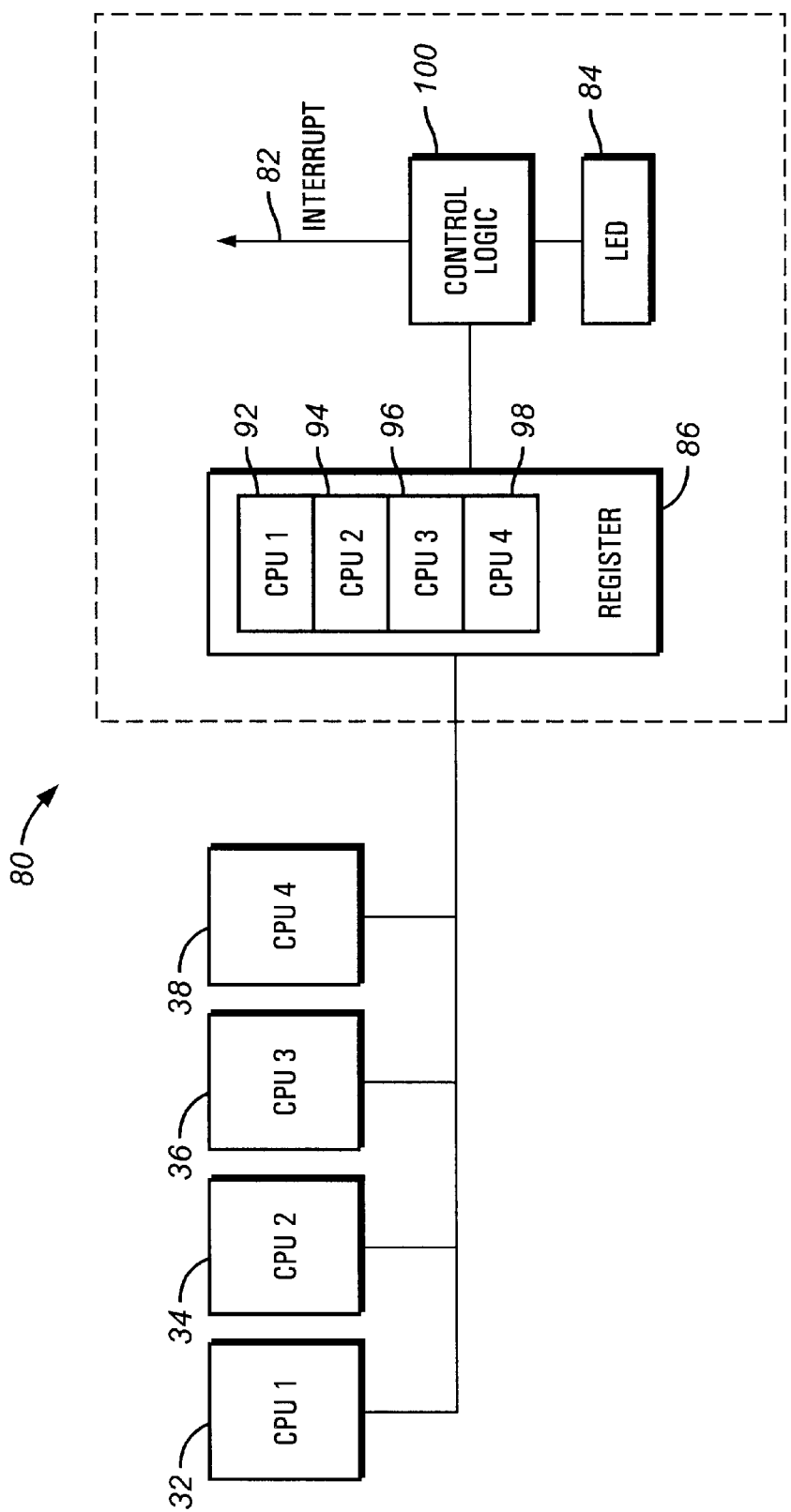
FIG. 4 illustrates a block diagram of test registers and control logic coupled to multiple processors.

One embodiment of the failure detection circuit 80 is illustrated in FIG. 4. The failure detection circuit 80, in this embodiment, includes a register bank 86. As illustrated, the register bank 86 includes a register 92, 94, 96, and 98 associated with each respective processor 32, 34, 36, and 38.

When the computer 30 is initially powered up, the computer's basic input-output system (BIOS), for example, identifies the processors 32, 34, 36, and 38 in the computer 30. Once identified, each processor 32, 34, 36, and 38 is assigned a different location for writing the results of a test performed by the particular processor. In this embodiment, these different write locations correspond to the registers 92, 94, 96, and 98 for each respective processor 32, 34, 36, and 38. Each processor 32, 34, 36, and 38 performs the particular test and writes the results to its corresponding register 92, 94, 96, or 98 within a given period of time.

Figure 5:
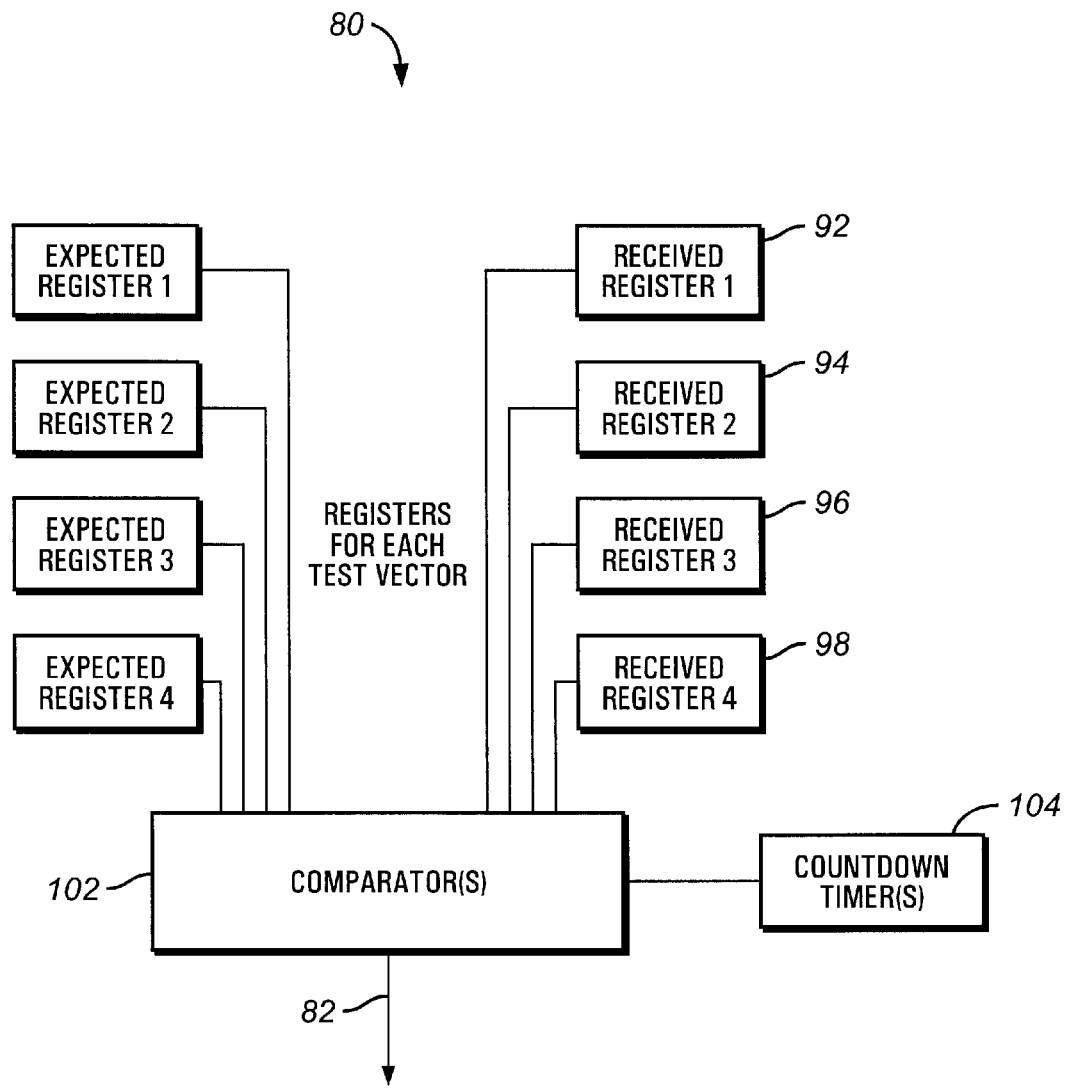
FIG. 5 illustrates a detailed block diagram of the test registers and one embodiment of the control logic of FIG. 4.

At the end of each test period, a control logic circuit 100 reads the content of each register 92, 94, 96, and 98 and compares the contents to expected results. The expected results of each test may be stored in a table stored in the system BIOS, for example. As more specifically illustrated in the detailed block diagram of the failure detection circuit 80 illustrated in FIG. 5, the table delivers the expected result for each register to a comparator circuit 102, and the registers 92, 94, 96, and 98 deliver the actual data received to the comparator circuit 102. The comparator circuit 102 typically includes a separate comparator for each register 92, 94, 96, 98 and its corresponding expected result. Each comparator may be an exclusive OR gate, for example. The comparator circuit 102 may also be coupled to one or more countdown timer circuits 104. If only one countdown timer circuit 104 is used, for example, all four processors 32, 34, 36, and 38 will have the same test period. Alternatively, if each comparator is coupled to its own countdown timer circuit 104, for example, each processor 32, 34, 36, and 38 may have a different test period. Regardless of the configuration, each time the countdown timer circuit 104 times out, the associated comparator or comparators compare the expected results with the received results. If the results received in the registers 92, 94, 96, and 98 are the same as the expected results, the registers 92, 94, 96, and 98 are cleared and the timer 104 is reset. However, if the results received in any register 92, 94, 96, or 98 are different than the expected results, the comparator circuit 102 delivers an interrupt signal on the line 82.

Figure 6:
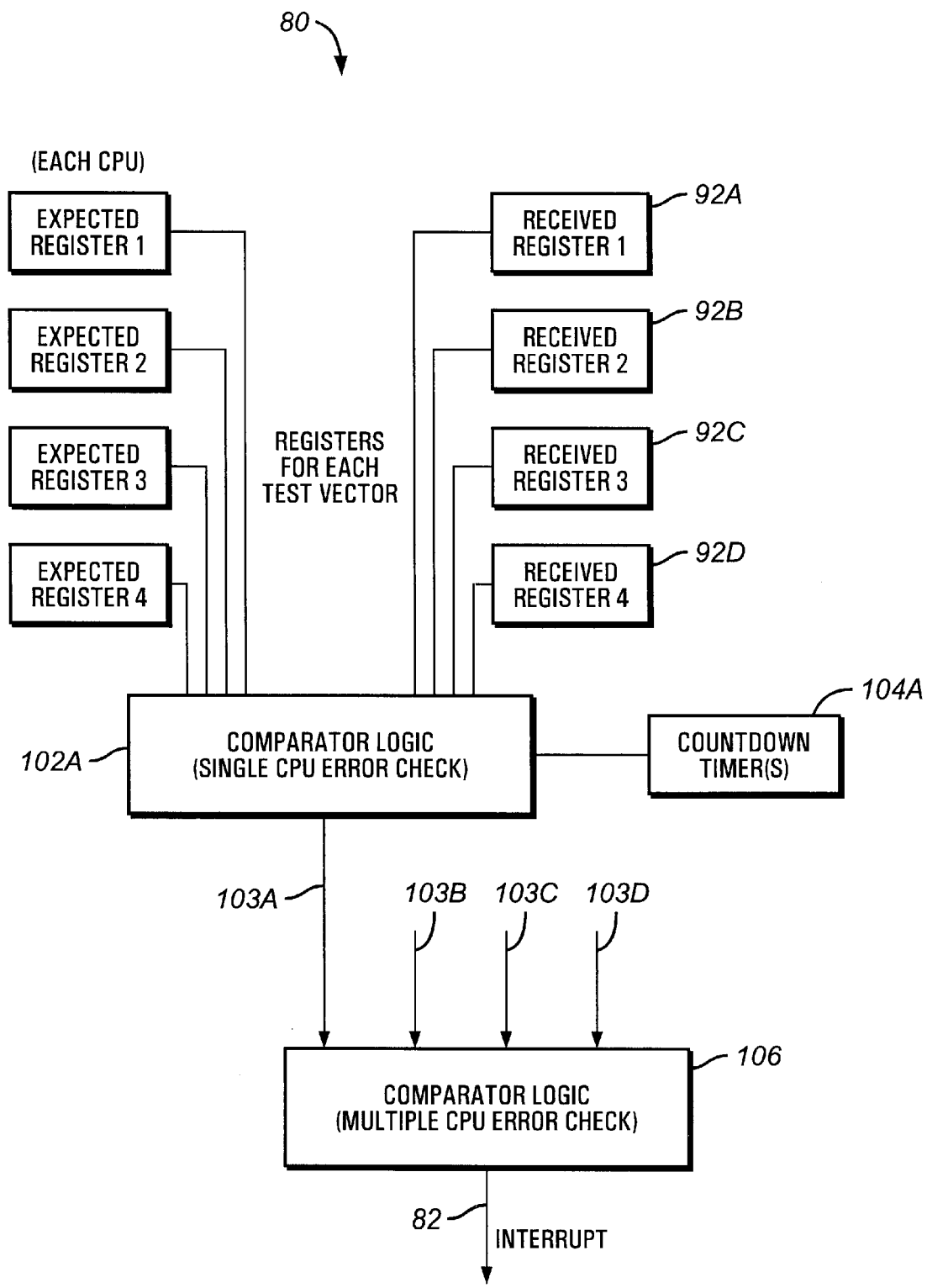
FIG. 6 illustrates a detailed block diagram of the test registers and an alternate embodiment of the control logic of FIG. 4.

As an alternate embodiment, the control logic circuit may be slightly modified to enable multiple tests to be executed by each processor 32, 34, 36, and 38 during a single test period. This alternate embodiment is illustrated in the detailed block diagram of the failure detection circuit 80 of FIG. 6. It should be noted that only the failure detection circuitry associated with the processor 32 is illustrated with the understanding that each of the other processors 34, 36, and 38 would be associated with a similar circuit. As illustrated, the processor 32 is assigned four registers 92A, 92B, 92C, and 92D or write locations in which to store the results of four tests. The system BIOS table delivers the expected result for each register to the comparator circuit 102A, and the registers 92A, 92B, 92C, and 92D deliver the actual data received to the comparator circuit 102A in the same manner as previously described. Also, as previously described, the comparator circuit 102A may be coupled to one or more countdown timer circuits 104A, so that the comparator circuit 102A compares the expected results with the received results each time the countdown timer circuit(s) 104A times out. If the results received in the registers 92A, 92B, 92C, and 92D are the same as the expected results, the registers are cleared and the timer(s) 104A is reset. However, if the results received in any register 92A, 92B, 92C, or 92D are different than the expected results, the comparator circuit 102A delivers a signal to a multiple comparator logic circuit 106 on line 103A. The multiple comparator logic circuit 106 receives signals from each comparator circuit 102 (not shown) associated with each of the other processors 34, 36, and 38 on lines 103B, 103C, and 103D, respectively. If any one of the comparator circuits 102 detects a failed processor, the multiple comparator logic circuit 106 delivers an interrupt signal on the line 82 to indicate that a processor has failed.

Although the embodiments illustrated and discussed above utilize logic external from the processors 32, 34, 36, and 38 to facilitate the fault detection scheme, the processors may perform similar error detection without the use of any external logic or with the use of minimal external logic. As one example, each processor, utilizing the appropriate software, may perform its test, store the results, and compare the stored results with expected results. If the stored results differ from the expected results, the processor may shut itself off, for instance, and transmit an appropriate signal to the user. As another example, each processor may perform its test, store the results, and check the results of every other processor. If each of the other processors determines that one of the processors has failed, the failed processor may be disabled.

The test or tests performed by each processor 32, 34, 36, and 38 advantageously meets two objectives. First, the test should be complex enough that a faltering or partially inoperable processor will be unable to complete it accurately. Second, the test should take little time to run so that it may be run intermittently without adversely affecting the normal processing operations of the processor. Tests which may meet both of these objectives include floating point operations, fixed point operations, and checksum operations, for example, because it is unlikely that a failing processor could accurately perform these operations and/or store the result in the correct write location.

Each processor may perform the same test each time, or each processor may perform one of a plurality of tests each time. For example, a number of tests may be stored in a BIOS table, for instance, along with the correct expected results for each test. Each time the processors are tested, a different test may be selected. The use of a plurality of different tests may be beneficial, because a failing processor would be quite unlikely to perform each of a plurality of tests accurately. Indeed, each test may be selected to test a different modality of the processor to make this fault detection scheme even more rigorous.

The tests may also be modified so that expected results are not stored in a table as described above. As one example, if each processor can perform multiple tests during each test period, as in FIG. 6 for instance, each processor may perform two different calculations that should yield identical results. These results may be compared with one another to determine whether the processor is operating properly. As another example, if all of the processors have synchronized test periods, the results of the same test by each processor may be compared with one another for each period. In this case, the majority rules in the sense that the processor that does not yield the same result as the other processors is presumed to have failed.

The rate at which these tests are performed may vary depending on a variety of different factors. For instance, if a selected test is particularly adept at determining whether the processor is fully operational, yet it takes longer to run than less comprehensive tests, the designer or programmer may choose to run this test less frequently than a less comprehensive, but quicker, test. Also, the criticality of the computer 30 in the system 10, the age of the processors 32, 34, 36, and 38, the history of past errors by the processors 32, 34, 36, and 38, environmental conditions, etc., may also be considered in determining the frequency and complexity of the tests performed.

Furthermore, the rate may be fixed, variable, or adaptive. For instance, upon consideration of various circumstances, such as those described above, a programmer may select a particular testing rate using a programmable timer that remains in effect until the rate is reprogrammed at a later point in time. Alternatively, the rate may be variable in that each time the computer 30 is powered up the rate may be adjusted upwardly or downwardly automatically based on one or more factors, such as those mentioned above. As another alternative, the rate may change adaptively based on continuously monitoring various factors, such as those mentioned above. For example, in U.S. patent application Ser. No. 09/195,922, entitled "Computer System With Adaptive Heartbeat" filed concurrently herewith and hereby incorporated by reference, there is disclosed a scheme by which a multiprocessor computer generates a "heartbeat" signal which is delivered to other computers in the network as part of a network fault-detection scheme. However, this process for generating these adaptive heartbeats may be used to generate an adaptive rate for performing the tests of the processors 32, 34, 36, and 38. For example, the heartbeats generated by such a system may be used to trigger the testing described above.

Regardless of the type of test performed and the rate at which the test is performed, once a test fails, the failure detection circuitry 80 delivers an interrupt signal on the line 82. As mentioned previously, this interrupt signal triggers the determination of which processor has failed, so that it may be shut down. In current systems, a single processor is usually defined as an interrupt handler at boot up, and this processor subsequently services interrupts produced by the system. However, if the failing processor is the interrupt handler, it cannot perform these duties. Therefore, when an interrupt signal is produced on line 82, a different processor may have to be chosen to handle the interrupt.

Figure 7:
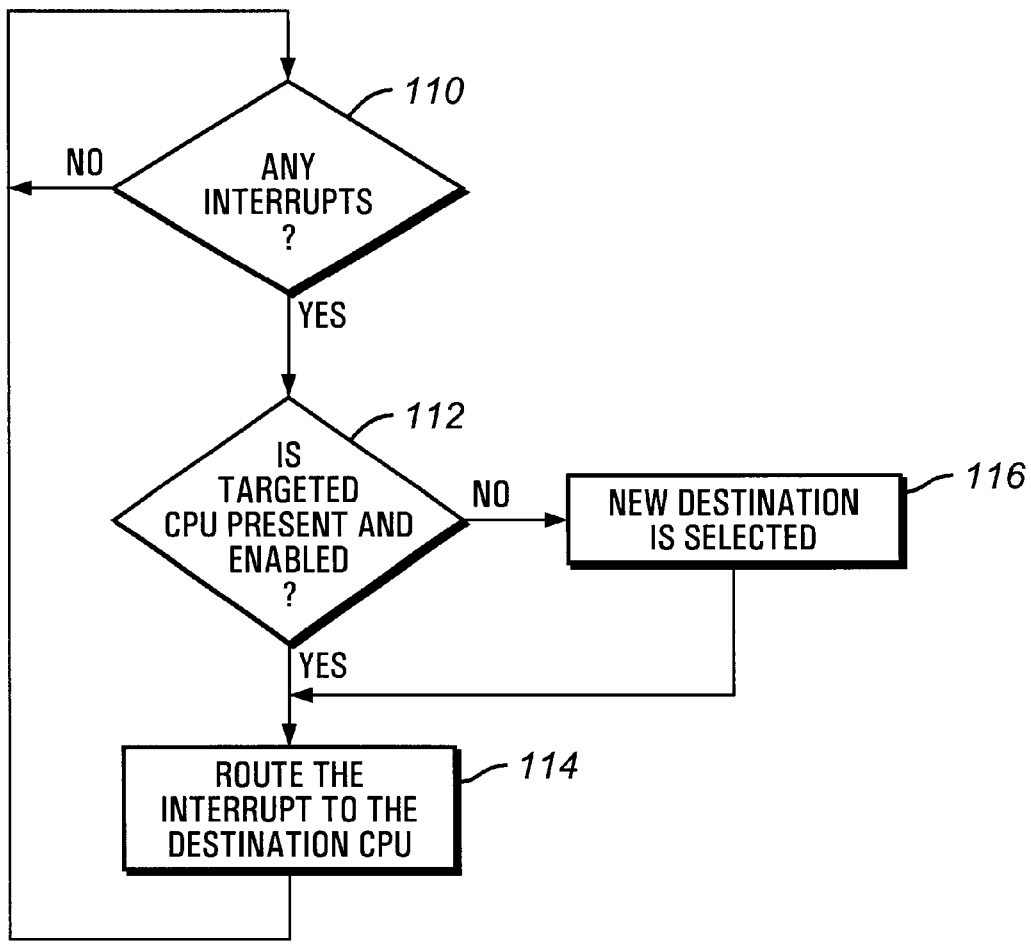
FIG. 7 illustrates a flow chart of a software routine for choosing a processor for handling an interrupt produced by the control logic of FIG. 4.

As illustrated in FIG. 7, an exemplary routine for making such a determination is described. First, the routine determines whether an interrupt signal has been generated. (Block 110). Once an interrupt has been generated, the processor designated as the interrupt handler is polled to determine whether it is present and enabled. (Block 112). If it is, the interrupt signal is routed to the processor which handles the interrupt signal. (Block 114). If not, a new processor is selected to act as the interrupt handler, and the interrupt signal is then routed to the newly selected processor. (Blocks 114 and 116).

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

What is claimed is:

1. A method of determining a processor failure in a multiprocessor computer, the method comprising the acts of:

(a) identifying each processor in the computer;

(b) assigning a unique write location to each identified processor;

(c) directing each processor to perform a given test and to store a result of the test in the respective unique write location;

(d) comparing the result stored in each unique write location to a respective expected result; and (e) indicating a failure of a particular one of the identified processors in response to the stored result being different than the expected result.

2. The method, as set forth in claim 1, wherein act (b) comprises the act of:

assigning a separate register to each identified processor.

3. The method, as set forth in claim 1, wherein act (b) comprises the act of:

assigning write locations in main memory to each identified processor.

4. The method, as set forth in claim 1, wherein act (c) comprises the act of:

directing each processor to perform a floating point operation.

5. The method, as set forth in claim 1, wherein act (c) comprises the act of:

directing each processor to perform a fixed point operation.

6. The method, as set forth in claim 1, wherein act (c) comprises the act of:

directing each processor to perform a checksum operation.

7. The method, as set forth in claim 1, comprising the act of:

(f) clearing each write location in response to the stored result being the same as the expected result; and (g) repeating acts (c) through (g) at a given rate.

8. The method, as set forth in claim 7, wherein act (c) comprises the act of:

directing each processor to perform the same test each time acts (c) through (g) are repeated.

9. The method, as set forth in claim 7, wherein act (c) comprises the act of:

directing each processor to perform a test selected from a plurality of tests each time acts (c) through (g) are repeated.

10. The method, as set forth in claim 1, wherein act (d) comprises the act of:

comparing the result stored in each unique write location to a respective expected result using a hardware comparator.

11. The method, as set forth in claim 1, wherein act (d) comprises the act of:

comparing the result stored in each unique write location to a respective expected result using a software comparator.

12. The method, as set forth in claim 1, wherein act (e) comprises the act of:

generating an interrupt.

13. The method, as set forth in claim 12, wherein act (e) comprises the act of:

identifying the failure of the particular one of the identified processor in response to the interrupt.

14. The method, as set forth in claim 1, wherein act (e) comprises the act of:

alerting a user of the computer that a processor has failed.

15. The method, as set forth in claim 1, wherein act (e) comprises the act of:

disabling the failed processor while the other processors continue to operate.

16. The method, as set forth in claim 1, wherein the acts are performed in the recited order.

17. A method of determining a processor failure in a multiprocessor computer, the method comprising the acts of:

(a) identifying each processor in the computer during a power up sequence;

(b) assigning a unique write location to each identified processor;

(c) setting a rate for directing each processor to perform a given test during normal operation of the computer;

(d) repeatedly directing each processor to perform the given test and to store a result of the test in the respective unique write location in accordance with the set rate;

(e) comparing the result stored in each unique write location to a respective expected result each time the given test is performed; and (f) indicating a failure of a particular one of the identified processors in response to the stored result being different than the expected result.

18. The method, as set forth in claim 17, wherein act (b) comprises the act of:

assigning a separate register to each identified processor.

19. The method, as set forth in claim 17, wherein act (b) comprises the act of:

assigning write locations in main memory to each identified processor.

20. The method, as set forth in claim 17, wherein act (c) comprises the act of:

setting a fixed rate.

21. The method, as set forth in claim 17, wherein act (c) comprises the act of:

setting a variable rate each time the computer is powered up.

22. The method, as set forth in claim 17, wherein act (c) comprises the act of:

setting a rate that adaptively changes during operation of the computer.

23. The method, as set forth in claim 17, wherein act (d) comprises the act of:

directing each processor to perform a floating point operation.

24. The method, as set forth in claim 17, wherein act (d) comprises the act of:

directing each processor to perform a fixed point operation.

25. The method, as set forth in claim 17, wherein act (d) comprises the act of:

directing each processor to perform a checksum operation.

26. The method, as set forth in claim 17, comprising the act of:

(g) clearing each write location in response to the stored result being the same as the expected result; and (h) repeating acts (d) through (h) at a given rate.

27. The method, as set forth in claim 26, wherein act (d) comprises the act of:

directing each processor to perform the same test each time acts (c) through (g) are repeated.

28. The method, as set forth in claim 26, wherein act (d) comprises the act of:

directing each processor to perform a test selected from a plurality of tests each time acts (c) through (g) are repeated.

29. The method, as set forth in claim 17, wherein act (e) comprises the act of:

comparing the result stored in each unique write location to a respective expected result using a hardware comparator.

30. The method, as set forth in claim 17, wherein act (e) comprises the act of:

comparing the result stored in each unique write location to a respective expected result using a software comparator.

31. The method, as set forth in claim 17, wherein act (f) comprises the act of:

generating an interrupt.

32. The method, as set forth in claim 31, wherein act (f) comprises the act of:

identifying the failure of the particular one of the identified processors in response to the interrupt.

33. The method, as set forth in claim 17, wherein act (f) comprises the act of:

updating a memory location with an error signal to indicate a processor failure.

34. The method, as set forth in claim 33, wherein act (f) further comprises the act of:

identifying the failure of the particular one of the identified processors in response to the error signal.

35. The method, as set forth in claim 17, wherein act (f) comprises the act of:

alerting a user of the computer that a processor has failed.

36. The method, as set forth in claim 17, wherein act (f) comprises the act of:

disabling the failed processor while the other processors continue to operate.

37. The method, as set forth in claim 17, wherein the acts are performed in the recited order.

38. A method of determining a failure of an intelligent device in a computer, the method comprising the acts of:

(a) identifying each intelligent device in the computer;

(b) assigning a unique write location to each identified intelligent device;

(c) directing each intelligent device to perform a given test and to store a result of the test in the respective unique write location;

(d) comparing the result stored in each unique write location to a respective expected result; and (e) indicating a failure of a particular one of the identified intelligent devices in response to the stored result being different than the expected result.

39. The method, as set forth in claim 38, comprising the act of:

(f) clearing each write location in response to the stored result being the same as the expected result; and (g) repeating acts (c) through (g) at a given rate.

40. The method, as set forth in claim 38, wherein the intelligent device comprises a microprocessor.

41. The method, as set forth in claim 38, wherein the intelligent device comprises a memory controller.

42. An apparatus for detecting a failed processor of a multiprocessor computer, the apparatus comprising:

means for identifying each processor in the computer;

means for assigning a unique write location to each identified processor;

means for directing each processor to perform a given test and to store a result of the test in the respective unique write location;

means for comparing the result stored in each unique write location to a respective expected result; and means for indicating a failure of a particular one of the identified processors in response to the stored result being different than the expected result.

43. The apparatus, as set forth in claim 42, further comprising:

means for setting a rate for directing each processor to perform a given test during normal operation of the computer.

44. The apparatus, as set forth in claim 42, further comprising:

means for clearing each write location in response to the stored result being the same as the expected result.

45. A tangible medium containing a software program for detecting a failed processor of a multiprocessor computer comprising:

a routine for assigning a unique write location to each processor in the computer;

a routine for directing each processor to perform a given test and to store a result of the test in the respective unique write location;

a routine for comparing the result stored in each unique write location to a respective expected result; and a routine for indicating a failure of a particular one of the identified processors in response to the stored result being different than the expected result.

46. The tangible medium, as set forth in claim 45, wherein the routine for indicating a failure comprises:

a routine for generating an interrupt.

47. The tangible medium, as set forth in claim 45, wherein the routine for indicating a failure comprises:

a routine for recording the failure in memory.

48. A network comprising:

a plurality of interconnected computers, wherein at least one of the plurality of interconnected computers comprises a multiprocessor computer, the multiprocessor computer comprising means for detecting a failed processor of a multiprocessor computer, the detecting means comprising:

means for identifying each processor in the multiprocessor computer;

means for assigning a unique write location to each identified processor;

means for directing each processor to perform a given test and to store a result of the test in the respective unique write location;

means for comparing the result stored in each unique write location to a respective expected result; and means for indicating a failure of a particular one of the identified processors in response to the stored result being different than the expected result.

49. The network, as set forth in claim 48, wherein the detecting means further comprises:

means for setting a rate for directing each processor to perform a given test during normal operation of the computer.

50. The network, as set forth in claim 48, wherein the detecting means further comprises:

means for clearing each write location in response to the stored result being the same as the expected result.

51. A computer comprising:

a plurality of microprocessors, each microprocessor repeatedly performing a given test during operation of the computer;

a plurality of registers, each register being assigned to a selected one of the plurality of microprocessors for storing a result of each given test performed by the respective microprocessor; and a comparator coupled to the plurality of registers to receive the result stored in each register, the comparator comparing each stored result with an expected result and generating an signal indicative of a failed microprocessor in response to one of the stored results being different than a respective one of the expected results.

52. A method of determining a processor failure in a multiprocessor computer, the method comprising the acts of:

(a) identifying each processor in the computer;

(b) assigning a plurality of unique write locations to each identified processor;

(c) directing each processor to perform a plurality of given tests and to store a result of each of the plurality of given tests in a respective one of the respective plurality of unique write locations;

(d) comparing the result stored in each write location to a respective expected result; and (e) indicating a failure of a particular one of the identified processors in response to the stored result being different than the expected result.

53. The method, as set forth in claim 52, wherein act (b) comprises the act of:

assigning a plurality of separate registers to each identified processor.

54. The method, as set forth in claim 52, wherein act (b) comprises the act of:

assigning a plurality of write locations in main memory to each identified processor.

55. The method, as set forth in claim 52, wherein act (c) comprises the act of:

directing each processor to perform a floating point operation.

56. The method, as set forth in claim 52, wherein act (c) comprises the act of:

directing each processor to perform a fixed point operation.

57. The method, as set forth in claim 52, wherein act (c) comprises the act of:

directing each processor to perform a checksum operation.

58. The method, as set forth in claim 52, comprising the act of:

(f) clearing each write location in response to the stored result being the same as the expected result; and (g) repeating acts (c) through (g) at a given rate.

59. The method, as set forth in claim 58, wherein act (c) comprises the act of:

directing each processor to perform the same plurality of tests each time acts (c) through (g) are repeated.

60. The method, as set forth in claim 58, wherein act (c) comprises the act of:

directing each processor to perform a plurality of tests selected from a greater plurality of tests each time acts (c) through (g) are repeated.

61. The method, as set forth in claim 52, wherein act (d) comprises the act of:

comparing the result stored in each unique write location to a respective expected result using a hardware comparator.

62. The method, as set forth in claim 52, wherein act (d) comprises the act of:

comparing the result stored in each unique write location to a respective expected result using a software comparator.

63. The method, as set forth in claim 52, wherein act (e) comprises the act of:

generating an interrupt.

64. The method, as set forth in claim 63, wherein act (e) comprises the act of:

identifying the failure of the particular one of the identified processor in response to the interrupt.

65. The method, as set forth in claim 52, wherein act (e) comprises the act of:

alerting a user of the computer that a processor has failed.

66. The method, as set forth in claim 52, wherein act (e) comprises the act of:

disabling the failed processor while the other processors continue to operate.

67. The method, as set forth in claim 52, wherein the acts are performed in the recited order.

* * * * *